US008494082B2

United States Patent
Nam et al.

(10) Patent No.: US 8,494,082 B2

(45) Date of Patent: Jul. 23, 2013

(54) APPARATUS FOR TRANSMITTING LAYERED DATA

(75) Inventors: Junyoung Nam, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 279 days.

(21) Appl. No.: 12/991,325

(22) PCT Filed: Mar. 6, 2009

(86) PCT No.: PCT/KR2009/002379

§ 371 (c)(1), (2), (4) Date: Nov. 5, 2010

(87) PCT Pub. No.: WO2009/136733

PCT Pub. Date: Nov. 12, 2009

(65) Prior Publication Data

US 2011/0075758 A1 Mar. 31, 2011

(30) Foreign Application Priority Data

May 6, 2008 (KR) ........................ 10-2008-0041964
Apr. 29, 2009 (KR) ........................ 10-2009-0037578

(51) Int. Cl.
*H04L 27/00* (2006.01)

(52) U.S. Cl.
USPC .......................................................... 375/295

(58) Field of Classification Search
USPC .......................................................... 375/295
See application file for complete search history.

(56) References Cited

U.S. PATENT DOCUMENTS

| | | | | |
|---|---|---|---|---|
| 4,039,961 | A * | 8/1977 | Ishio et al. | 329/308 |
| 7,079,585 | B1 * | 7/2006 | Settle et al. | 375/261 |
| 7,173,981 | B1 * | 2/2007 | Chen et al. | 375/322 |
| 2001/0012322 | A1 * | 8/2001 | Nagaoka et al. | 375/240 |
| 2005/0143085 | A1 * | 6/2005 | Bi et al. | 455/452.2 |
| 2007/0147539 | A1 * | 6/2007 | Gorokhov et al. | 375/295 |
| 2008/0276287 | A1 | 11/2008 | Mizuta | |
| 2008/0303699 | A1 * | 12/2008 | Zhang et al. | 341/67 |
| 2009/0262803 | A1 * | 10/2009 | Wang et al. | 375/240.12 |
| 2010/0046675 | A1 * | 2/2010 | Collins et al. | 375/340 |

FOREIGN PATENT DOCUMENTS

| | | | |
|---|---|---|---|
| WO | 2005065204 | A2 | 7/2005 |
| WO | 2006076451 | A2 | 7/2006 |

* cited by examiner

*Primary Examiner* — Juan A Torres

(74) *Attorney, Agent, or Firm* — Nelson Mullins Riley & Scarborough LLP; EuiHoon Lee, Esq.

(57) ABSTRACT

A transmission apparatus, including: a first encoding unit to encode first layer data based on a first encoding scheme and generate first encoded data; a second encoding unit to encode both the first encoded data and second layer data based on a second encoding scheme and generate second encoded data; and a transmission unit to transmit the second encoded data to a receiving apparatus.

11 Claims, 7 Drawing Sheets

FIRST TRANSMISSION DATA
410 FIRST DATA DIVISION UNIT
420 FIRST ENCODING UNIT
430 SECOND ENCODING UNIT
470 TRANSMISSION UNIT
SECOND TRANSMISSION DATA
440 SECOND DATA DIVISION UNIT
450 THIRD ENCODING UNIT
460 FOURTH ENCODING UNIT

APPARATUS FOR TRANSMITTING LAYERED DATA

Related Applications

This application is a 35 U.S.C. §371 national stage filing of PCT Application No. PCT/KR2009/002379 filed on May 6, 2009, which claims priority to, and the benefit of, Korean Patent Application No. 10-2008-0041964 filed on May 6, 2008 and Korean Patent Application No. 10-2009-0037578 filed on Apr. 29, 2009. The contents of the aforementioned applications are hereby incorporated by reference.

TECHNICAL FIELD

The present invention relates to a technology that transmits a plurality of pieces of layer data.

BACKGROUND ART

Digital broadcasting may have a quality superior to analog broadcasting. However, digital broadcasting may not be received when a channel is degraded below a particular standard, while a receiving quality of analog broadcasting deteriorates as a channel is degraded. To overcome the disadvantage, a layered modulation may be applied.

Also, a digital wireless communication system has been developed after the advent of a second generation mobile communication system such as a Global System for Mobile Communication (GSM) scheme and a Code Division Multiple Access (CDMA) scheme. Currently, a convergence technology that provides a wireless multicast/broadcast service through a separate multicast/broadcast channel comes into the spotlight in a wireless communication system. Currently, a technology that provides a particular terminal with a Video On Demand (VOD) service or a multimedia service including a video through a given unicast channel is also the focus of attention.

Scalable Video Coding (SVC), which is a multimedia compression technology for source coding required in a broadcasting or communication system, is also in the limelight since it may satisfy a variety of requirements and Quality of Service (QoS). SVC is a source coding scheme appropriate for a heterogeneous network where a broadcasting network and other communication networks are connected, and may transmit a single video source using a plurality of layers. A receiving end may receive a portion of or entire layers with a higher priority depending on conditions such as a channel state, and replay a video with variable qualities. Layering of SVC may include a temporal layering, a spatial layering, and a quality layering. The temporal layering may variably control the number of frames per second, the spatial layering may variably control a size of a replay screen, and the quality layering may variably control a video quality such as the number of bits per pixel. Also, in SVC, each layer may not be independently decoded. That is, only when layers with higher priority than a corresponding layer itself are decoded may the corresponding layer be decoded, which is known as layered decoding.

In a wireless broadcasting and communication system, a transmission scheme that has a number of layers is required to make the most use of SVC.

As an example of a wireless transmission technology supporting layer transmission of a multimedia source in a conventional art, mediaFLO of Qualcomm® has proposed layered modulation. Layered modulation may first modulate multimedia data of a basic layer using a Quadrature Phase-shift keying (QPSK), and include an enhanced layer to the multimedia data of the basic layer, and transmit data of the two layers using 16-state Quadrature Amplitude Modulation (16-QAM). In this instance, a terminal with a suitable channel state may receive the two layers without error, and a terminal with an unsuitable channel state may receive only data of the basic layer. Although layered modulation may be easily embodied due to the simple structure, the number of layers may be limited.

Accordingly, a wireless transmission technology that may have a number of layers is required.

DISCLOSURE OF INVENTION

Technical Problem

An aspect of the present invention provides a transmission and receiving apparatus that may enable a number of pieces of layer data that may be received to be varied depending on a channel state of the receiving apparatus.

Technical Solution

According to an aspect of the present invention, there is provided a transmission apparatus, including: a first encoding unit to encode first layer data based on a first encoding scheme and generate first encoded data; a second encoding unit to encode both the first encoded data and second layer data based on a second encoding scheme and generate second encoded data; and a transmission unit to transmit the second encoded data to a receiving apparatus.

A transmission apparatus, including: a first encoding unit to encode first layer data based on a first encoding scheme and generate first encoded data; a second encoding unit to encode both the first encoded data and second layer data based on a second encoding scheme and generate second encoded data; a third encoding unit to encode third layer data based on a third encoding scheme and generate third encoded data; a fourth encoding unit to encode both the third encoded data and fourth layer data based on a fourth encoding scheme and generate fourth encoded data; a precoding unit to multiply the second encoded data and the fourth encoded data with a precoding matrix to generate a plurality of data streams; and a transmission unit to transmit the plurality of data streams to a receiving apparatus using a transmission antenna corresponding to each of the plurality of data streams.

A receiving apparatus, including: a receiving unit to receive first encoded data from a transmission apparatus; a first decoding unit to decode the first encoded data based on a first encoding scheme and generate second decoded data and first layer data; and a second decoding unit to decode the second decoded data based on a second encoding scheme and generate second layer data.

According to an embodiment of the present invention, a number of pieces of layer data that may be received may vary depending on a channel state of a receiving apparatus, and thus a receiving apparatus with an unsuitable channel state may maintain basic communication and a receiving apparatus with a suitable channel state may be provided with a high quality communication service.

MODE FOR THE INVENTION

Figure 1:
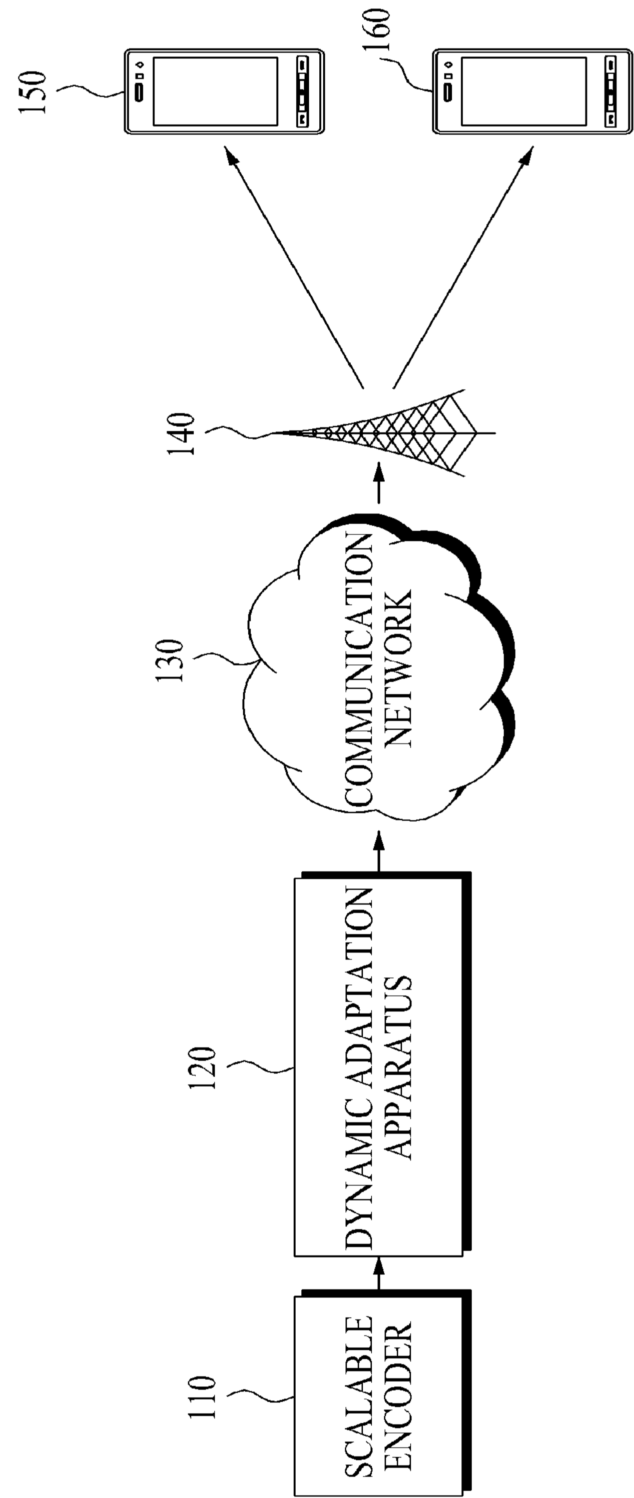
FIG. 1 is a conceptual diagram illustrating a data transmission method according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a conceptual diagram illustrating a data transmission method according to an embodiment of the present invention.

A scalable encoder 110 may encode multimedia data for each layer. Basic layer data may include a minimum amount of data to replay the multimedia data. Enhanced layer data may include additional data to improve a sound/video quality of the multimedia data.

When a channel state of a receiving apparatus 150 is not suitable, the receiving apparatus 150 may receive only the basic layer data and replay a multimedia source. However, when a channel state of a receiving apparatus 160 is suitable, the receiving apparatus 160 may receive both the basic layer data and the enhanced layer data, and replay high quality multimedia data.

A dynamic adaptation apparatus 120 may determine layer data to be transmitted to each of the receiving apparatuses 150 and 160 based on information of the receiving apparatuses 150 and 160 receiving the layer data. That is, when the receiving apparatus 150 includes a small screen, the receiving apparatus 150 may receive only basic layer data. When the receiving apparatus 160 includes a large screen, the receiving apparatus 160 may receive both the basic layer data and the enhanced layer data.

The layer data which is encoded by the scalable encoder 110 and selected by the dynamic adaptation apparatus 120 may be transmitted to a transmission apparatus 140 via a communication network 130.

The transmission apparatus 140 may encode the layer data of each layer based on a nested coding scheme, and transmit the encoded layer data to each of the receiving apparatuses 150 and 160.

When the channel state of the receiving apparatus 150 is not suitable, the receiving apparatus 150 may receive only the basic layer data from among the layer data encoded based on the nested coding scheme.

When the channel state of the receiving apparatus 160 is suitable, the receiving apparatus 160 may receive both the basic layer data and the enhanced layer data from among the layer data encoded based on the nested coding scheme.

The receiving apparatus 150 with an unsuitable channel state may maintain a basic communication and the receiving apparatus 160 with a suitable channel state may be provided with a high quality communication service.

Figure 2:
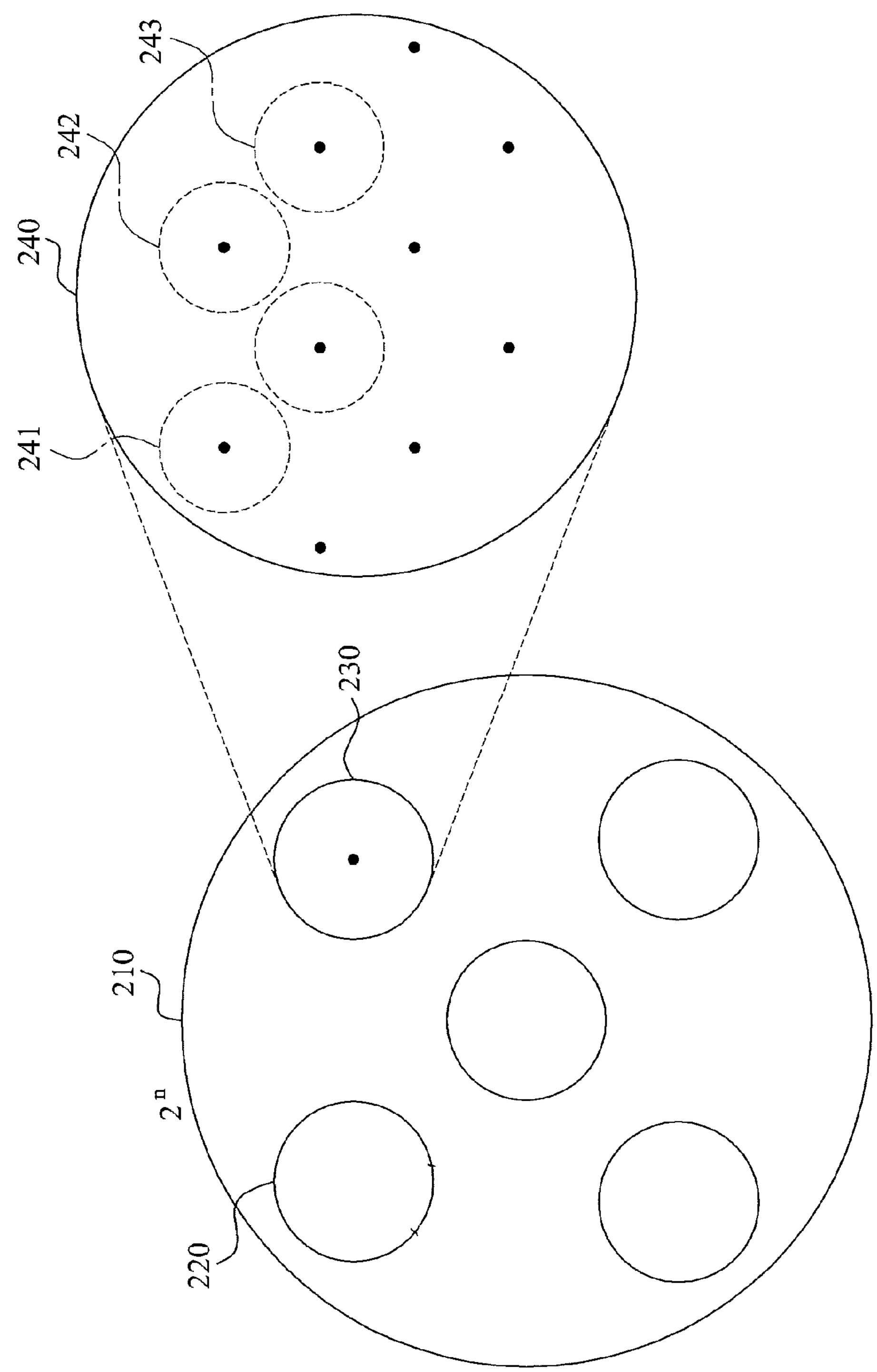
FIG. 2 is a conceptual diagram illustrating a nested coding scheme according to an embodiment of the present invention.

FIG. 2 is a conceptual diagram illustrating a nested coding scheme according to an embodiment of the present invention.

A state of digital data may be defined as one of '0' and '1'. Accordingly, a state of n-bit data may be located in a $2^n$ space 210. Hereinafter, a concept of encoding data ($w_1$, $w_2$), configured as two pieces of layer data, based on the nested coding scheme is described in detail.

A transmission apparatus may encode data $w_2$ based on an encoding scheme and generate encoded data $c_2(w_2)$. A code rate of the encoding scheme may be $R_2$. Also, the transmission apparatus may encode both data $w_1$ and the encoded data $c_2(w_2)$ based on an encoding scheme, and generate encoded data $c_1(w_1, w_2)$. In this instance, a code rate of the encoding scheme may be $R_1$ and a code rate of the encoded data $c_1(w_1, w_2)$ may be $R_1+R_2$.

Although an embodiment where the data configured as the two pieces of layer data is encoded based on the nested coding scheme has been described, the nested coding scheme may be applied to a number of pieces of layer data.

A receiving apparatus receiving the encoded data based on the nested coding scheme may decode both the data $w_1$ and the data $w_2$ based on a channel state, or decode any one of the data $w_1$ and the data $w_2$ based on the channel state and apparatus information about the receiving apparatus. That is, the receiving apparatus may variably decode data based on the channel state or the apparatus information. Accordingly, a data transmission rate which is close to a maximum data transmission rate may be obtained depending on the channel state.

The encoded data $c_2(w_2)$ may be mapped to a center point of each of data spaces 220 and 230 divided within the $2^n$ space 210. When both the encoded data $c_2(w_2)$ and the data $w_1$ are encoded together, the data ($w_1$, $w_2$) may be mapped to any one point of sub data spaces 241, 242, and 243 in the data spaces 230 and 240.

Figure 3:
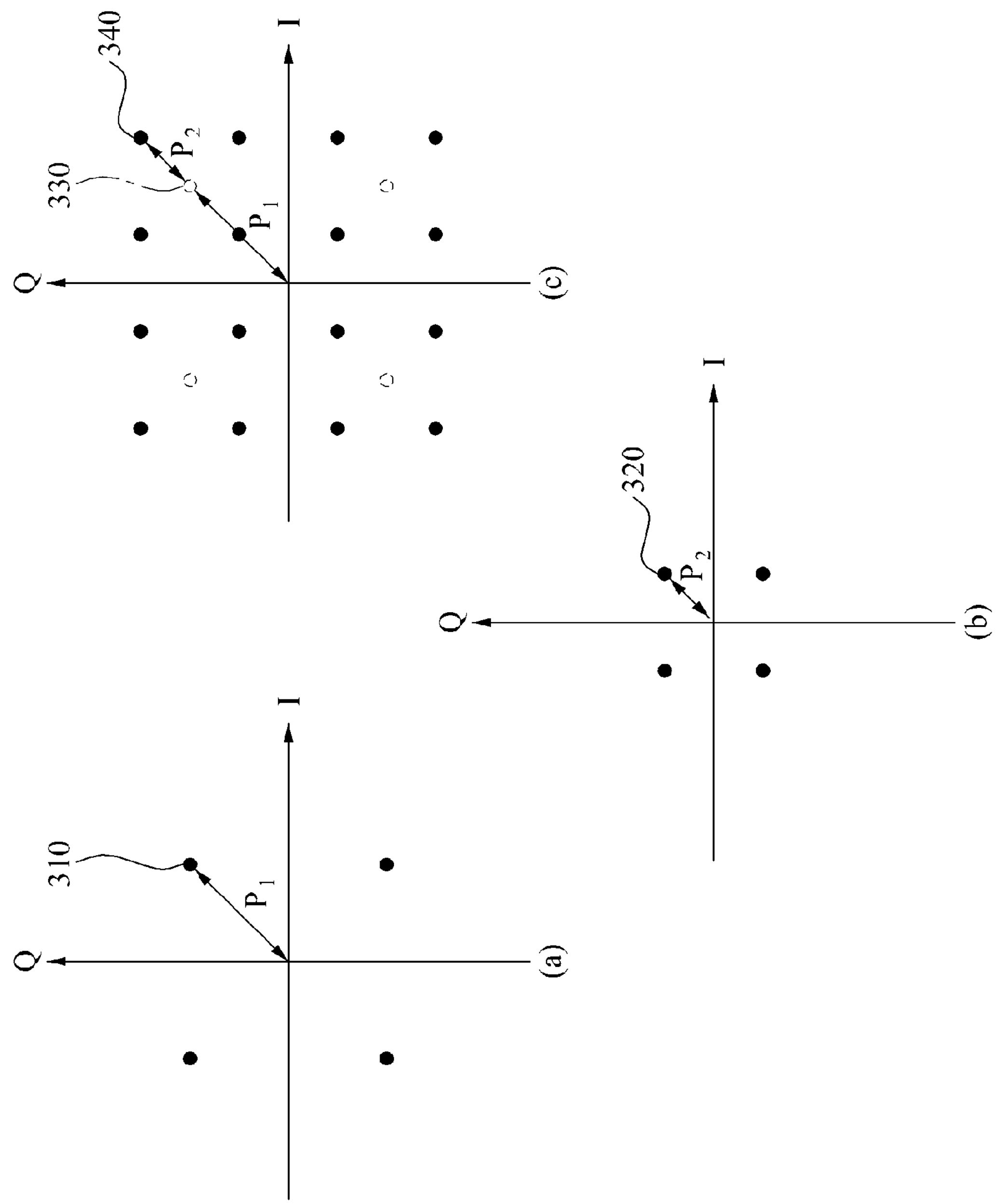
FIG. 3 conceptual diagram of a nested coding scheme according to an embodiment of the present invention.

FIG. 3 conceptual diagram of a nested coding scheme according to an embodiment of the present invention. An embodiment where basic layer data is modulated based on a Quadrature Phase-shift keying (QPSK) modulation scheme in a high power and enhanced layer data is modulated based on a QPSK modulation scheme in a low power is illustrated in FIG. 3.

FIG. 3 (*a*) illustrates a modulation of the basic layer data. An embodiment where a power of a symbol 310 where the basic layer data is mapped is $P_1$ is illustrated in FIG. 3 (*a*).

FIG. 3 (*b*) illustrates a modulation of the enhanced layer data. An embodiment where a power of a symbol 320 where the enhanced layer data is mapped is $P_2$ is illustrated in FIG. 3 (*b*). When comparing FIG. 3 (*a*) and FIG. 3 (*b*), it may be ascertained that the power of the basic layer data, $P_1$, is greater than the power of the enhanced layer data, $P_2$.

FIG. 3 (*c*) illustrates that the modulated basic layer data and the modulated enhanced layer data are superposed. When a receiving apparatus accurately detects a symbol 340 where the basic layer data and the enhanced layer data are superposed, the receiving apparatus may determine the basic layer data and the enhanced layer data, respectively. The receiving apparatus may first determine the basic layer data 330, and determine the enhanced layer data through a successive cancellation of the determined basic layer data 330 from the superposed symbol 340.

Since the power of the enhanced layer data, $P_2$, is relatively insignificant, the receiving apparatus may not receive the enhanced layer data when a channel state is not suitable. The receiving apparatus may receive only the basic layer data transmitted in the power of the basic layer data, $P_1$.

Figure 4:
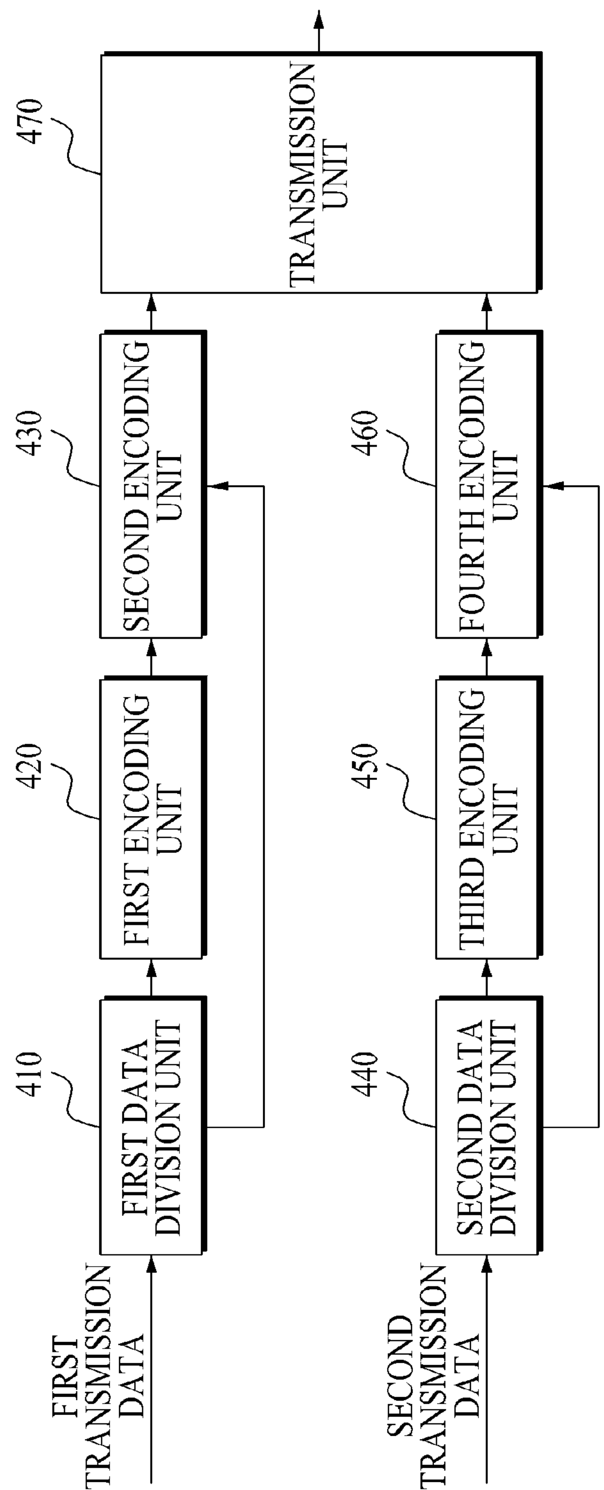
FIG. 4 is a block diagram illustrating a configuration of a transmission apparatus according to an embodiment of the present invention.

FIG. 4 is a block diagram illustrating a configuration of a transmission apparatus according to an embodiment of the present invention. The transmission apparatus may include at least one data division unit, that is, a first data division unit 410 and a second data division unit 440, a first encoding unit 420, a second encoding unit 430, a third encoding unit 450, a fourth encoding unit 460, and a transmission unit 470.

The first encoding unit 420 may encode first layer data based on a first encoding scheme and generate first encoded data. The first encoding scheme may include a convolutional coding scheme, a turbo encoding scheme, and a low density parity check (LDPC) encoding scheme.

The second encoding unit 430 may encode both the first encoded data and second layer data based on a second encoding scheme and generate second encoded data. The second encoding scheme may include the convolutional encoding scheme, the turbo encoding scheme, and the LDPC encoding scheme.

According to an embodiment of the present invention, the first encoding scheme may be different from the second encoding scheme. Also, a code rate of the first encoding scheme may be different from a code rate of the second encoding scheme. A receiving apparatus which receives the second encoded data may compare a channel state of the receiving apparatus to each of the code rate of the first encoding scheme and the code rate of the second encoding scheme. Also, the receiving apparatus may selectively decode any one of the first layer data and the second layer data.

The third encoding unit 450 may encode third layer data based on a third encoding scheme and generate third encoded data. The third encoding scheme may include the convolutional encoding scheme, the turbo encoding scheme, and the LDPC encoding scheme.

The fourth encoding unit 460 may encode both the third encoded data and fourth layer data based on a fourth encoding scheme and generate fourth encoded data. The fourth encoding scheme may include the convolutional encoding scheme, the turbo encoding scheme, and the LDPC encoding scheme.

According to an embodiment of the present invention, the first data division unit 410 may divide $1^{st}$ original data into the first layer data and the second layer data. For example, the first data division unit 410 may divide particular multimedia data into basic layer data and enhanced layer data. Here, the basic layer data may be a minimum amount of data to replay the multimedia data, and the enhanced layer data may be data to improve a sound quality or a video quality of the multimedia data. The first data division unit 410 may generate the basic layer data as the first layer data, and generate the enhanced layer data as the second layer data.

Also, the second data division unit 440 may divide $2^{nd}$ original data into the first layer data and the second layer data in a similar manner as the first data division unit 410. The second data division unit 440 may generate the basic layer data as third layer data, and the enhanced layer data as fourth layer data.

The transmission unit 470 may transmit the second encoded data or the fourth encoded data to the receiving apparatus. The transmission unit 470 may transmit the second encoded data in a first transmit power, and transmit the fourth encoded data in a second transmit power. The transmission unit 470 may change a value of the first transmit power and the second transmit power depending on a channel state. An operation of the transmission unit 470 is described in greater detail with reference to FIG. 5.

Figure 5:
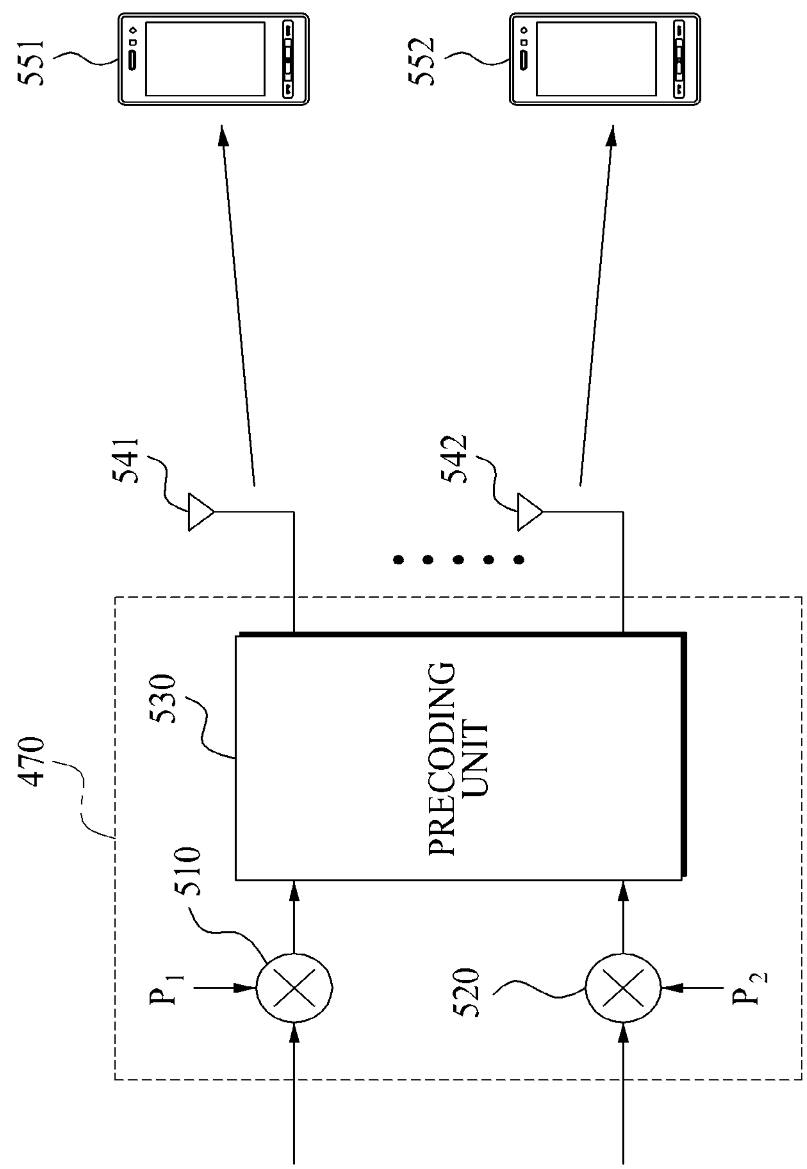
FIG. 5 is a block diagram illustrating a configuration of the transmission unit of FIG. 4.

FIG. 5 is a block diagram illustrating a configuration of the transmission unit 470 of FIG. 4. The transmission unit 470 may include power control units 510 and 520, and a precoding unit 530.

The first power control unit 510 may control a transmit power of the second encoded data, and the second power control unit 520 may control a transmit power of the fourth encoded data. The first power control unit 510 and the second power control unit 520 may control the transmit power of each of the second encoded data and the fourth encoded data depending on a channel state of each of the receiving apparatuses 551 and 552, a data rate of original data, and the like.

According to an embodiment of the present invention, the first power control unit 510 and the second power control unit 520 may control the transmit power of each of the second encoded data and the fourth encoded data based on a receiving priority order of layer data included in each of the second encoded data and the fourth encoded data.

The precoding unit 530 may multiply the power-controlled second encoded data and the controlled fourth encoded data with a precoding matrix, and generate a plurality of data streams.

According to an embodiment of the present invention, the precoding unit 530 may control the precoding matrix to obtain a diversity gain, or to obtain a spatial multiplexing gain.

The transmission unit 470 may transmit the plurality of data streams to the receiving apparatuses 551 and 552 using transmission antennas 541 and 542 corresponding to each of the plurality of data streams.

Figure 6:
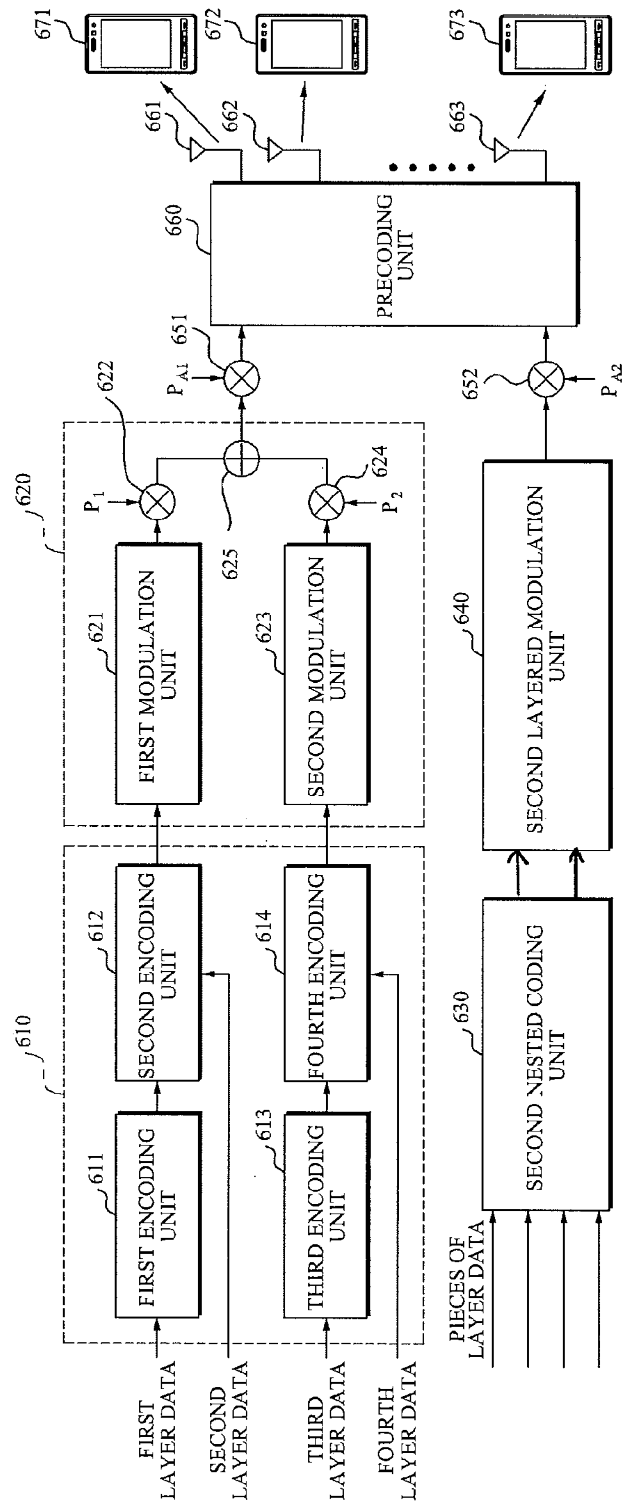
FIG. 6 is a block diagram illustrating a configuration of a transmission apparatus according to another embodiment of the present invention.

FIG. 6 is a block diagram illustrating a configuration of a transmission apparatus according to another embodiment of the present invention. The transmission apparatus may include layer encoding units 610 and 630, layer modulation units 620 and 640, power control units 651 and 652, and a precoding unit 660.

The layer encoding units 610 and 630 may generate encoded data using a layer encoding scheme. The layer encoding scheme may be an encoding scheme to generate the encoded data using a plurality of encoding schemes. In this instance, a code rate of each of the plurality of encoding schemes may be different.

The first layer encoding unit 610 may include a first encoding unit 611, a second encoding unit 612, a third encoding unit 613, and a fourth encoding unit 614.

The first encoding unit 611 may encode first layer data based on a first encoding scheme, and generate first encoded data. The second encoding unit 612 may encode the first encoded data and second layer data based on a second encoding scheme, and generate second encoded data.

Also, the third encoding unit 613 may encode third layer data based on a third encoding scheme, and generate third encoded data. The fourth encoding unit 614 may encode the third encoded data and fourth layer data based on a fourth encoding scheme, and generate fourth encoded data.

The second layer encoding unit 630, that is, a second nested coding unit 630, may encode pieces of layer data and generate pieces of encoded data in a similar manner as the first layer encoding unit 610.

The first layer modulation unit 620 may include a plurality of modulation units 621 and 623 and a plurality of power control units 622 and 624. The first modulation unit 621 may modulate the second encoded data generated by the second encoding unit 612. The second modulation unit 623 may modulate the fourth encoded data generated by the fourth encoding unit 614. The first power control unit 622 may control a transmit power of the modulated second encoded data. The second power control unit 624 may control a transmit power of the modulated fourth encoded data.

The second layer encoding unit 630 and the second layer modulation unit 640 may encode and modulate pieces of layer data in a similar manner as the first layer encoding unit 610 and the first layer modulation unit 620.

A multiple-input and multiple-output (MIMO) antenna system may provide diversity for a lower error rate and spatial multiplexing for a high transmission rate. The MIMO antenna system may enable a layered spatial multiplexing.

According to an embodiment of the present invention, pieces of independent encoded data may be transmitted. Also, a basic layer with a higher priority may be transmitted in a relatively high transmit power, a relatively low code rate, and/or using a low-level modulation scheme to enable a receiving apparatus to perform a layer receiving.

According to another embodiment of the present invention, an enhanced layer with a relatively low priority may be transmitted in a relatively low transmit power, a relatively high code rate, and/or using a high-level modulation scheme. Accordingly, a terminal with a suitable channel state may receive the enhanced layer.

According to the present invention, a layer encoding scheme, a layer modulation scheme, and an MIMO may be combined, and thus a greater number of layers may be transmitted/received. A number of layers that may be transmitted by the transmission apparatus of FIG. 6 may be determined by multiplying a number of layers supported by the layer encoding scheme, a number of layers supported by the layer modulation scheme, and a number of layers supported by the MIMO.

When the layer encoding scheme supports three layers, the layer modulation scheme supports two layers, and the MIMO supports two layers, the transmission apparatus may transmit total 12 layers.

The number of layers supported by the MIMO may be determined by a smaller number of a number of transmission antennas 661, 662 and 663 and a number of receiving antennas.

Receiving apparatuses 671, 672 and 673 may selectively receive at least one layer from a plurality of layers based on a channel state or apparatus information of the receiving apparatuses 671, 672 and 673. Accordingly, even when the transmission apparatus transmits same data, a number of layers that may be received by each of the receiving apparatuses 671, 672 and 673 may be different. Therefore, a data rate of multimedia data that each of the receiving apparatuses 671, 672 and 673 replays may vary.

Figure 7:
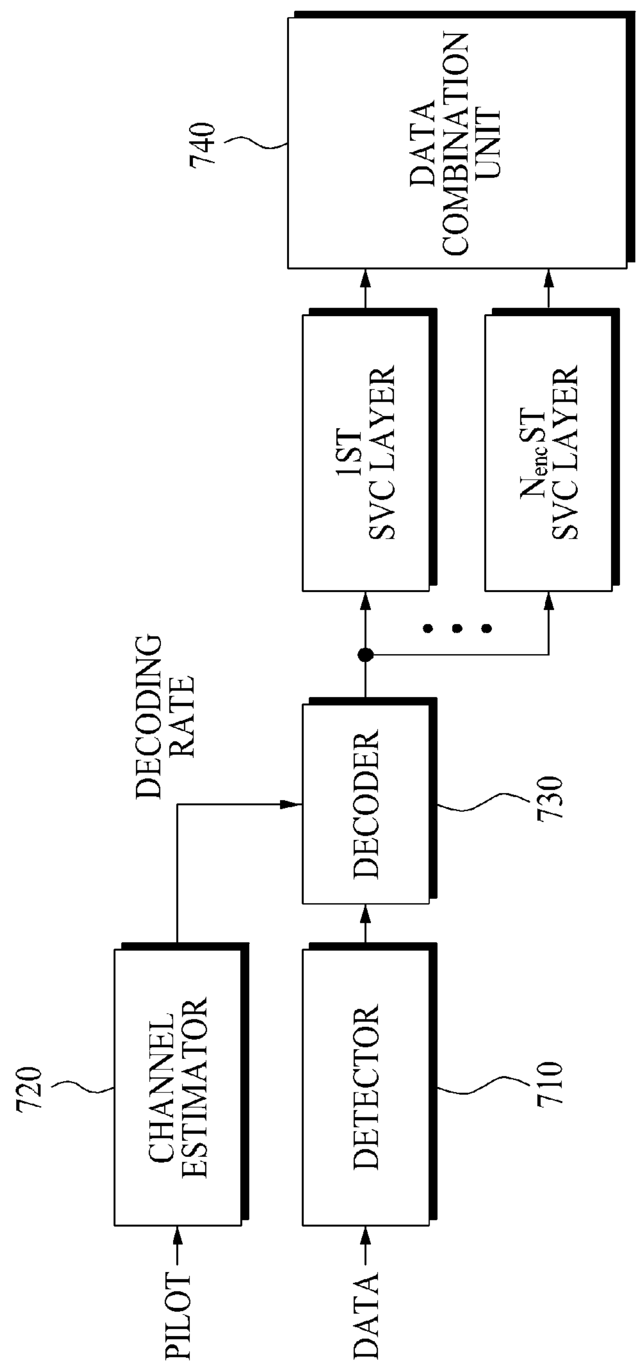
FIG. 7 is a block diagram illustrating a configuration of a receiving apparatus according to an embodiment of the present invention.

FIG. 7 is a block diagram illustrating a configuration of a receiving apparatus according to an embodiment of the present invention. The receiving apparatus may include an MIMO detector 710, a channel estimator 720, a channel decoder 730, and a data combination unit 740.

A process of receiving a signal transmitted as illustrated in FIG. 6 is described in detail. The signal, multiplexing-transmitted as described above, may first be separated from multiplexing antenna signals through the MIMO detector 710. For example, the MIMO detector 710 may first detect a basic layer in a first stream for layered modulation. The detected signal may be restored as a transmission signal through the channel decoder 730 in a decoding rate corresponding to a channel state. Here, it may be assumed that the restored signal is accurate. When the restored signal is removed from the receiving signal, a subsequent layer of the layered modulation may be restored in a same manner as the above-described process, and thus the first stream may be completely decoded. A decoding operation with respect to remaining streams may be the same as the above-described decoding.

The decoding operation is described in greater detail with reference to FIG. 7. A characteristic of a channel code according to the present invention is that layer multimedia data of various levels may be supported, and code words for each layer may have a layered structure. For example, the layered structure may indicate that, when code word sets for two layers, $C_1$ and $C_2$, exist, the code word set $C_2$ of a basic layer may be a subset of the code word set $C_1$ of an upper layer. Accordingly, a characteristic that uses the single code word set $C_1$ to decode the two layers may be efficiently used for the decoding operation. As illustrated in FIG. 7, when a decoding rate is determined in the channel estimator 720, the channel decoder 730 may completely decode layer data to a corresponding layer through a single decoding operation. That is, the decoding operation may be simultaneously performed with respect to decodable layers, while encoding may be performed through a plurality of operations depending on a number of layers. The above-described characteristic may be different from the layered modulation which requires an additional layered decoding for each layer.

The data combination unit 740 may combine first layer data and second layer data and generate receiving data. According to an embodiment of the present invention, the receiving data may be multimedia data, the first layer data may be basic layer data of the multimedia data, and the second layer data may be enhanced layer data of the multimedia data.

A receiving apparatus may replay the multimedia data using the basic layer data of the multimedia data. However, the receiving apparatus may improve a sound/video quality of the multimedia data by additionally using the enhanced layer data.

The receiving apparatus may receive a portion of layer data from among pieces of layer data based on apparatus information of the receiving apparatus or a channel state. For example, when the channel state is not suitable, the receiving apparatus may receive only the basic layer data. Also, when a small screen is included in the receiving apparatus, the receiving apparatus may receive only the basic layer data.

According to an embodiment of the present invention, the basic layer data may be transmitted in a higher transmit power than the enhanced layer data. Accordingly, a receiving apparatus, that may not receive the enhanced layer data due to a long distance from the transmission apparatus, may receive the basic layer data. The receiving apparatus located far away from the transmission apparatus may replay the multimedia data using only the basic layer data.

A receiving apparatus located closed to the transmission apparatus may receive the enhanced layer data as well as the basic layer data. Accordingly, the receiving apparatus located closed to the transmission apparatus may replay the multimedia data with an improved sound/video quality.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A transmission apparatus, comprising:

a first encoding unit to encode first layer data based on a first encoding scheme and generate first encoded data;

a second encoding unit to encode both the first encoded data and second layer data based on a second encoding scheme and generate second encoded data; and a transmission unit to transmit the second encoded data to a receiving apparatus, transmission power being determined based on either a channel state of the receiving apparatus and a data rate of original data or a receiving priority of the layer data included in the encoded data.

2. The transmission apparatus of claim 1, wherein the first encoding scheme is different from the second encoding scheme.

3. The transmission apparatus of claim 1, wherein a code rate of the first encoding scheme is different from a code rate of the second encoding scheme.

4. The transmission apparatus of claim 1, further comprising:

a third encoding unit to encode third layer data based on a third encoding scheme and generate third encoded data; and a fourth encoding unit to encode both the third encoded data and fourth layer data based on a fourth encoding scheme and generate fourth encoded data, wherein the transmission unit transmits the second encoded data in a first transmit power and transmits the fourth encoded data in a second transmit power to the receiving apparatus.

5. The transmission apparatus of claim 1, further comprising:

a data division unit to divide transmission data into the first layer data and the second layer data.

6. The transmission apparatus of claim 4, wherein the first transmit power is different from the second transmit power.

7. A transmission apparatus, comprising:

a first encoding unit to encode first layer data based on a first encoding scheme and generate first encoded data;

a second encoding unit to encode both the first encoded data and second layer data based on a second encoding scheme and generate second encoded data;

a third encoding unit to encode third layer data based on a third encoding scheme and generate third encoded data;

a fourth encoding unit to encode both the third encoded data and fourth layer data based on a fourth encoding scheme and generate fourth encoded data;

a precoding unit to multiply the second encoded data and the fourth encoded data with a precoding matrix to generate a plurality of data streams; and a transmission unit to transmit the plurality of data streams to a receiving apparatus using a transmission antenna corresponding to each of the plurality of data streams, transmission power being determined based on either a channel state of the receiving apparatus and a data rate of original data or a receiving priority of the layer data included in the encoded data.

8. The transmission apparatus of claim 7, wherein the first encoding scheme is different from the second encoding scheme.

9. The transmission apparatus of claim 7, wherein a code rate of the first encoding scheme is different from a code rate of the second encoding scheme.

10. The transmission apparatus of claim 7, wherein the transmission unit transmits the second encoded data in a first transmit power and transmits the fourth encoded data in a second transmit power to the receiving apparatus.

11. The transmission apparatus of claim 10, wherein the first transmit power is different from the second transmit power.

* * * * *